United States Patent
Allec et al.

(10) Patent No.: US 10,503,254 B2
(45) Date of Patent: Dec. 10, 2019

(54) MOTION AND GESTURE INPUT FROM A WEARABLE DEVICE

(71) Applicant: Apple Inc., Cupertino, CA (US)

(72) Inventors: Nicholas Paul Joseph Allec, Menlo Park, CA (US); Xiaoyi Mu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/914,838

(22) Filed: Mar. 7, 2018

(65) Prior Publication Data

US 2018/0196514 A1 Jul. 12, 2018

Related U.S. Application Data

(63) Continuation of application No. 14/973,573, filed on Dec. 17, 2015, now Pat. No. 9,939,899.
(Continued)

(51) Int. Cl.
*G06F 3/01* (2006.01)
*G06F 3/03* (2006.01)
(Continued)

(52) U.S. Cl.
CPC .............. *G06F 3/014* (2013.01); *G06F 3/015* (2013.01); *G06F 3/017* (2013.01); *G06F 3/0304* (2013.01);
(Continued)

(58) Field of Classification Search
CPC .......... G06F 3/014; G06F 3/015; G06F 3/017; G06F 3/0308; G06F 3/0304;
(Continued)

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

EP 2 290 583 A1 3/2011
EP 2 698 686 A2 2/2014
(Continued)

OTHER PUBLICATIONS

Eisenstein, J. S. et al. (May 2, 2001). "Analysis of Clustering Techniques to Detect Hand Signs," *Intelligent Multimedia, Video and Speech Processing, of 2001 International Symposium*, Piscataway, NJ, USA, IEEE, pp. 259-262.
(Continued)

*Primary Examiner* — Charles V Hicks
(74) *Attorney, Agent, or Firm* — Brownstein Hyatt Farber Schreck, LLP

(57) ABSTRACT

This disclosure relates to detecting hand gesture input using an electronic device, such as a wearable device strapped to a wrist. The device can have multiple photodiodes, each sensing light at a different position on a surface of the device that faces skin of a user. Examples of the disclosure detect hand gestures by recognizing patterns in sensor data that are characteristic of each hand gesture, as the tissue expands and contracts and anatomical features in the tissue move during the gesture.

18 Claims, 8 Drawing Sheets

Related U.S. Application Data

(60) Provisional application No. 62/233,295, filed on Sep. 25, 2015.

(51) Int. Cl.
  *G06K 9/00* (2006.01)
  *G06K 9/20* (2006.01)
  *G06K 9/62* (2006.01)

(52) U.S. Cl.
  CPC ........ *G06F 3/0308* (2013.01); *G06K 9/00355* (2013.01); *G06K 9/00536* (2013.01); *G06K 9/2018* (2013.01); *G06K 9/6202* (2013.01); *G06K 9/6218* (2013.01)

(58) Field of Classification Search
  CPC .. G06K 9/2018; G06K 9/6202; G06K 9/6218; G06K 9/00536; G06K 9/00355
  See application file for complete search history.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,244,873 B1 | 6/2001 | Hill et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,547,282 B2 | 6/2009 | Lo et al. | |
| 7,570,295 B2 | 8/2009 | Funato | |
| 7,616,110 B2 | 11/2009 | Crump et al. | |
| 7,663,607 B2 | 2/2010 | Hotelling et al. | |
| 8,170,656 B2 | 5/2012 | Tan et al. | |
| 8,378,811 B2 | 2/2013 | Crump et al. | |
| 8,436,810 B2 | 5/2013 | Langereis et al. | |
| 8,447,704 B2 | 5/2013 | Tan et al. | |
| 8,479,122 B2 | 7/2013 | Hotelling et al. | |
| 8,618,930 B2 | 12/2013 | Papadopoulos et al. | |
| 8,634,808 B1 | 1/2014 | Zhong et al. | |
| 8,963,806 B1 | 2/2015 | Starner et al. | |
| 9,044,149 B2 | 6/2015 | Richards et al. | |
| 9,081,542 B2 | 7/2015 | Dickinson et al. | |
| 9,265,449 B2 | 2/2016 | Donaldson | |
| 9,389,694 B2 | 7/2016 | Ataee et al. | |
| 9,592,007 B2 | 3/2017 | Nuovoo et al. | |
| 9,668,676 B2 | 6/2017 | Culbert | |
| 9,770,185 B2 | 9/2017 | Wheeler et al. | |
| 9,811,648 B2 | 11/2017 | Choi et al. | |
| 9,848,825 B2 | 12/2017 | Morris et al. | |
| 9,880,632 B2 | 1/2018 | Ataee et al. | |
| 9,939,899 B2 | 4/2018 | Allec et al. | |
| 9,946,395 B2 | 4/2018 | Zhang et al. | |
| 10,042,422 B2 | 8/2018 | Morun et al. | |
| 10,088,924 B1* | 10/2018 | Ivanchenko | G06F 1/1686 |
| 10,152,082 B2 | 12/2018 | Bailey | |
| 2002/0024500 A1 | 2/2002 | Howard | |
| 2005/0234351 A1 | 10/2005 | Nishii et al. | |
| 2006/0197753 A1 | 9/2006 | Hotelling | |
| 2008/0300055 A1 | 12/2008 | Lutnick et al. | |
| 2009/0174578 A1* | 7/2009 | Taki | G01B 11/002 341/20 |
| 2009/0306487 A1 | 12/2009 | Crowe et al. | |
| 2010/0182126 A1 | 7/2010 | Martis et al. | |
| 2010/0289772 A1 | 11/2010 | Miller | |
| 2011/0054360 A1 | 3/2011 | Son et al. | |
| 2011/0148568 A1 | 6/2011 | Lim et al. | |
| 2011/0173204 A1* | 7/2011 | Murillo | G06F 3/017 707/741 |
| 2011/0235926 A1 | 9/2011 | Yokono | |
| 2012/0127070 A1 | 5/2012 | Ryoo et al. | |
| 2012/0188158 A1 | 7/2012 | Tan et al. | |
| 2014/0028546 A1 | 1/2014 | Jeon et al. | |
| 2014/0031698 A1 | 1/2014 | Moon et al. | |
| 2014/0094675 A1 | 4/2014 | Luna | |
| 2014/0155705 A1 | 6/2014 | Papadopoulos et al. | |
| 2014/0240103 A1 | 8/2014 | Lake et al. | |
| 2014/0282270 A1 | 9/2014 | Slonneger | |
| 2015/0019135 A1 | 1/2015 | Kacyvenski et al. | |
| 2015/0084860 A1 | 3/2015 | Aleem et al. | |
| 2015/0193102 A1 | 7/2015 | Lanier et al. | |
| 2015/0366504 A1* | 12/2015 | Connor | A61B 5/6804 600/301 |
| 2015/0370333 A1 | 12/2015 | Ataee et al. | |
| 2016/0091980 A1 | 3/2016 | Baranski | |
| 2017/0031453 A1 | 2/2017 | Presura | |
| 2018/0078183 A1 | 3/2018 | Lor et al. | |
| 2018/0307314 A1 | 10/2018 | Connor | |
| 2019/0000354 A1 | 1/2019 | Lor | |
| 2019/0220099 A1 | 7/2019 | Baranski et al. | |

FOREIGN PATENT DOCUMENTS

| | | |
|---|---|---|
| JP | 2000-163031 A | 6/2000 |
| JP | 2002-342033 A | 11/2002 |
| KR | 2012-0054809 A | 5/2012 |
| WO | WO-2012/138663 A2 | 10/2012 |
| WO | WO-2014/117125 A1 | 7/2014 |
| WO | WO-2015/060856 A1 | 4/2015 |
| WO | WO-2015/119637 A1 | 8/2015 |
| WO | WO-2015/121100 A1 | 8/2015 |
| WO | WO-2016/053459 A1 | 4/2016 |
| WO | WO-2017/052957 A1 | 3/2017 |

OTHER PUBLICATIONS

Final Office Action dated Mar. 10, 2017, for U.S. Appl. No. 14/616,573, filed Feb. 6, 2015, five pages.

International Search Report dated Mar. 21, 2016, for PCT Application No. PCT/US2015/042978, filed Jul. 30, 2015, six pages.

International Search Report dated Nov. 7, 2016, for PCT Application No. PCT/US2016/048582, filed Aug. 25, 2016, five pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Morganti, E. et al. (2012). "A smart watch with embedded sensors to recognize objects, grasps and forearm gestures," SciVerse ScienceDirect, Engineering Procedia, available online at www.sciencedirect.com, pp. 1169-1175.

Non-Final Office Action dated Jun. 16, 2016, for U.S. Appl. No. 14/616,573, filed Feb. 6, 2015, eleven pages.

Non-Final Office Action dated Dec. 21, 2016, for U.S. Appl. No. 15/038,419, filed May 20, 2016, twelve pages.

Non-Final Office Action dated Apr. 20, 2017, for U.S. Appl. No. 14/973,573, filed Dec. 17, 2015, 33 pages.

Non-Final Office Action dated Jun. 14, 2017, for U.S. Appl. No. 14/616,573, filed Feb. 6, 2015, 12 pages.

Non-Final Office Action dated Jun. 14, 2017, for U.S. Appl. No. 14/616,573, filed Feb. 6, 2015, twelve pages.

Non-Final Office Action dated Dec. 18, 2017, for U.S. Appl. No. 14/616,573, filed Feb. 6, 2015, 19 pages.

Notice of Allowance dated Apr. 3, 2017, for U.S. Appl. No. 15/038,419, filed May 20, 2016, ten pages.

Notice of Allowance dated Nov. 30, 2017, for U.S. Appl. No. 14/973,573, filed Dec. 17, 2015, 8 pages.

Reuss, J.L., et al. (Oct. 23-26, 2002). "Period Domain Analysis in Fetal Pulse Oximetry," Proceedings of the Second Joint EMBS/BMES Conference, Houston, TX, two pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

(56) References Cited

OTHER PUBLICATIONS

U.S. Appl. No. 14/616,573, filed Feb. 6, 2015, entitled, "Motion and Gesture Input From a Wearable Device."

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Zhao, S. et al. (Nov. 5, 2014). "Wireless Photoplethysmograph Knuckle Sensor System for Measuring Finger Motions," *2014 International Symposium on Optomechatronic Technologies IEEE*, p. 205-209, XP032783703.

Zheng, N. et al. (Oct. 17, 2011) "An Efficient User Verification System via Mouse Movements," Computer and Communications Security, ACM, 2 Penn Plaza, New York, NY, USA, pp. 139-150, XP058006047, DOI: 10.1145/2046707.2046725 ISBN: 978-1-4503-0948-6.

Non-Final Office Action dated Sep. 11, 2018, for U.S. Appl. No. 15/705,644, filed Sep. 15, 2017, 19 pages.

Final Office Action dated Aug. 31, 2018, for U.S. Appl. No. 14/616,573, filed Feb. 6, 2015, 20 pages.

Notice of Allowance dated Jan. 9, 2019, for U.S. Appl. No. 14/616,573, filed Feb. 6, 2015, 9 pages.

Non-Final Office Action dated Mar. 19, 2019, for U.S. Appl. No. 15/705,644, filed Sep. 15, 2017, 18 pages.

\* cited by examiner

MOTION AND GESTURE INPUT FROM A WEARABLE DEVICE

CROSS REFERENCES TO RELATED APPLICATIONS

This application is a continuation of U.S. patent application Ser. No. 14/973,573, filed Dec. 17, 2015 and published on Mar. 30, 2017 as U.S. Patent Publication No. US 2017/0090567, which claims the benefit of U.S. Provisional Patent Application No. 62/233,295, filed Sep. 25, 2015.

FIELD OF THE DISCLOSURE

This relates generally to detecting a user's motion and gesture input to provide commands to one or more devices. In particular, a device can use one or more sensors to determine a user's motion and gesture input based on movements of the user's hand, arm, wrist, and fingers.

BACKGROUND OF THE DISCLOSURE

Some existing portable electronic devices accept voice or touch input to control functionality of the devices. For example, a voice command system can map specific verbal commands to operations such as initiating a voice call with a particular contact in response to speaking the contact's name. In another example, a touch input system can map specific touch gestures to operations such as zooming out in response to a pinch gesture on a touch sensitive surface. However, there may be situations where the user's ability to speak a verbal command or perform a touch gesture may be limited.

SUMMARY OF THE DISCLOSURE

This disclosure relates to detecting hand gesture input using an electronic device, such as a wearable device strapped to a wrist. The device can have multiple photodiodes, each sensing light at a different position on a surface of the device that faces skin of a user. Due to this positioning, the sensor data from the photodiodes can capture movement of anatomical features in the tissue of the user during a hand gesture. Further, different light emitters on the device can emit light at different wavelengths (e.g., infrared light, green light, etc.), which penetrate to different depths in the tissue of the user before reflecting back to the photodiodes on the device. Accordingly, sensor data from the photodiodes can capture expansion and contraction in the tissue of the user during a hand gesture. Examples of the disclosure detect hand gestures by recognizing patterns in sensor data that are characteristic of each hand gesture, as the tissue expands and contracts and anatomical features in the tissue move during the gesture.

In one example, the device can be trained on sensor data as the user performs a plurality of hand gestures. For example, during a first period, a user can perform a hand flap gesture and sensor data can be collected as the gesture is performed. During a second period, a user can perform a hand clench gesture and further sensor data can be collected as the gesture is performed. The sensor data can then be processed to calculate signal characteristics (e.g., peak/trough extraction, phase detection, etc., as described below) based on the sensor data for each period. The signal characteristics can then be clustered (e.g., using a clustering algorithm such as k-means clustering), including assigning some or all of the signal characteristics from the first period to a first cluster and some or all of the signal characteristics from the second period to a second cluster. The first cluster can be considered a pattern that is characteristic of the hand flap gesture that was performed during the first period, and the second cluster can be considered a pattern that is characteristic of the hand clench gesture that was performed during the second period.

Gesture detection can then be performed based, in part, on the clusters formed during training. Further sensor data can be collected during a third period, and signal characteristics can be calculated from that sensor data. After calculating the signal characteristics from the third period, a hand gesture can be detected based on the cluster that the signal characteristics belong to. For example, if most of the signal characteristics from the third period belong to the first cluster, then a hand flap gesture can be detected. If most of the signal characteristics from the third period belong to the second cluster, then a hand clench gesture can be detected. If most of the signal characteristics from the third period belong to a third cluster, then it can be determined that the user has not performed the first hand gesture or the second hand gesture.

BRIEF DESCRIPTION OF THE DRAWINGS

For a better understanding of the various described examples, reference should be made to the Detailed Description below, in conjunction with the following drawings in which like reference numerals refer to corresponding parts throughout the figures.

DETAILED DESCRIPTION

Figure 1A:
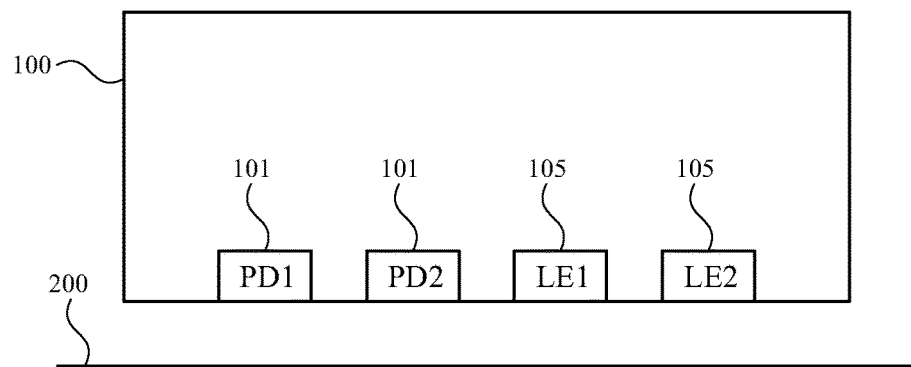
FIGS. 1A-1C illustrate an exemplary electronic device with a plurality of sensors in accordance with examples of the disclosure.

In the following description, reference is made to the accompanying drawings which form a part hereof, and in which it is shown by way of illustration specific examples that can be practiced. It is to be understood that other examples can be used and structural changes can be made without departing from the scope of the disclosed examples.

This disclosure relates to detecting hand gesture input using an electronic device, such as a wearable device strapped to a wrist. The device can have multiple photodiodes, each sensing light at a different position on a surface of the device that faces skin of a user. Due to this positioning, the sensor data from the photodiodes can capture movement of anatomical features in the tissue of the user during a hand gesture. Further, different light emitters on the device can emit light at different wavelengths (e.g., infrared light, green light, etc.), which penetrate to different depths in the tissue of the user before reflecting back to the photodiodes on the device. Accordingly, sensor data from the photodiodes can capture expansion and contraction in the tissue of the user during a hand gesture. Examples of the disclosure detect hand gestures by recognizing patterns in sensor data that are characteristic of each hand gesture, as the tissue expands and contracts and anatomical features in the tissue move during the gesture.

In one example, the device can be trained on sensor data as the user performs a plurality of hand gestures. For example, during a first period, a user can perform a hand flap gesture and sensor data can be collected as the gesture is performed. During a second period, a user can perform a hand clench gesture and further sensor data can be collected as the gesture is performed. The sensor data can then be processed to calculate signal characteristics (e.g., peak/trough extraction, phase detection, etc., as described below) based on the sensor data for each period. The signal characteristics can then be clustered (e.g., using a clustering algorithm such as k-means clustering), including assigning some or all of the signal characteristics from the first period to a first cluster and some or all of the signal characteristics from the second period to a second cluster. The first cluster can be considered a pattern that is characteristic of the hand flap gesture that was performed during the first period, and the second cluster can be considered a pattern that is characteristic of the hand clench gesture that was performed during the second period.

Gesture detection can then be performed based, in part, on the clusters formed during training. Further sensor data can be collected during a third period, and signal characteristics can be calculated from that sensor data. After calculating the signal characteristics from the third period, a hand gesture can be detected based on the cluster that the signal characteristics belong to. For example, if most of the signal characteristics from the third period belong to the first cluster, then a hand flap gesture can be detected. If most of the signal characteristics from the third period belong to the second cluster, then a hand clench gesture can be detected. If most of the signal characteristics from the third period belong to a third cluster, then it can be determined that the user has not performed the first hand gesture or the second hand gesture.

Although examples of the disclosure may be described herein primarily in terms of wearable devices strapped to a wrist and hand gestures, particularly hand flap gestures and hand clench gestures, it should be understood that examples of the disclosure are not so limited, but include wearable devices attached to other body parts, such as upper arms or legs, and gestures that can result therefrom.

Further, although examples of the disclosure may be described herein primarily in terms of devices with a plurality of photodiodes, it should be understood that examples of the disclosure are not so limited, but include devices with only a single photodiode. A channel of sensor data can correspond to each unique light sensor/emitter pair, whether there is one or multiple sensors, one or multiple emitters, etc.

Figure 1B:
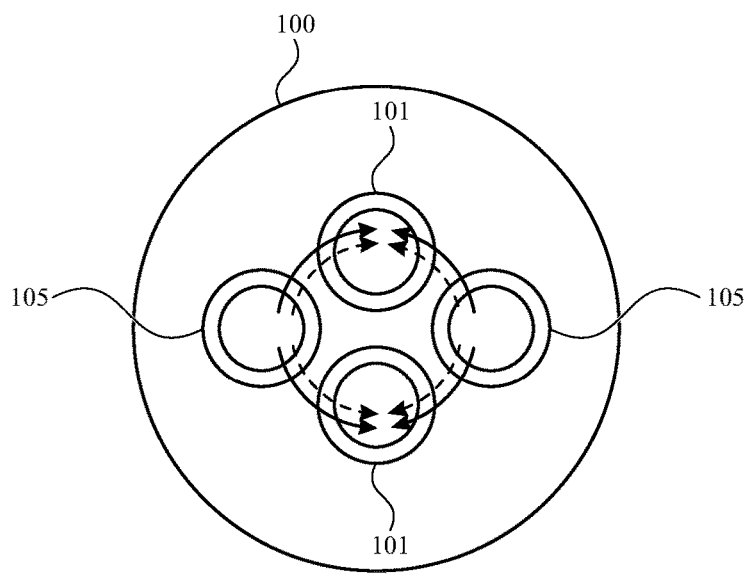
Figure 1C:
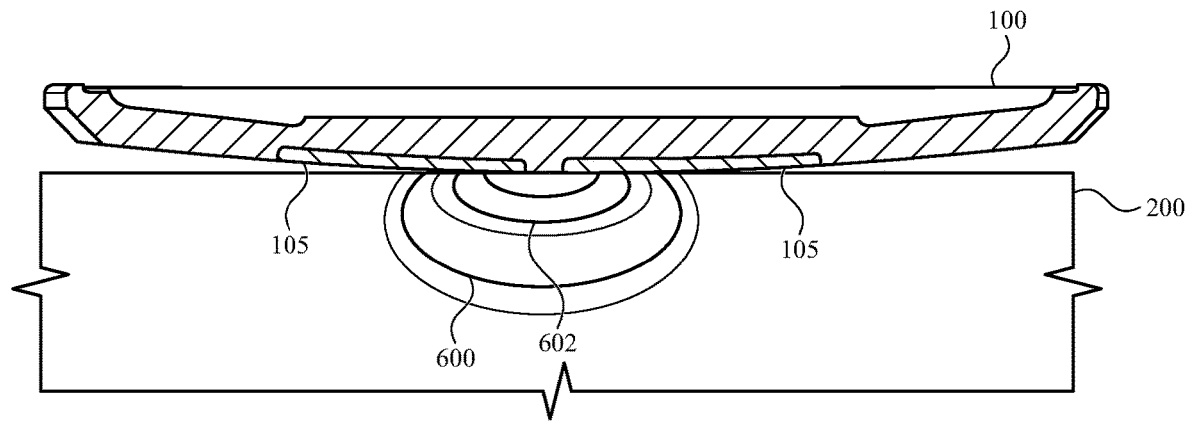

FIGS. 1A-1C illustrate an exemplary electronic device 100 with a plurality of sensors in accordance with examples of the disclosure. The electronic device 100 can include a plurality of photodiodes 101 (or any other light sensors) and a plurality of light emitters 105 (e.g., light-emitting diodes, etc.). When the electronic device is in use, the photodiodes 101 and the light emitters 105 face the tissue 200 of a user.

As illustrated in FIG. 1B, each photodiode 101 can sense light at a different position on a surface of the device 100 that faces the tissue 200 of a user. Due to this positioning, the sensor data from the photodiodes 101 can capture movement of anatomical features in the tissue 200 of the user during a hand gesture. Further, as illustrated in FIG. 1C, different light emitters 105 on the device 100 can emit light at different wavelengths (e.g., infrared light 600, green light 602, etc.), which penetrate to different depths in the tissue 200 of the user before reflecting back to the photodiodes on the device. Accordingly, sensor data from the photodiodes 101 can capture expansion and contraction in the tissue 200 of the user during a hand gesture.

In some examples, each possible photodiode emitter combination can be considered a separate channel of light sensor data. For example, in a device with two green light emitters, two infrared light emitters, and two photodiodes, there can be eight channels of light sensor data. When the first green light emitter emits light, the first and second photodiodes sense first and second channels of light sensor data, respectively. When the second green light emitter emits light, the first and second photodiodes sense third and fourth channels of light sensor data, respectively. When the first infrared light emitter emits light, the first and second photodiodes sense fifth and sixth channels of light sensor data, respectively. When the second infrared light emitter emits light, the first and second photodiodes sense seventh and eight channels of light sensor data, respectively.

In some examples, the device 100 can further include sensors that provide additional channels of sensor data. For example, a device that includes an accelerometer and a force sensor can provide four additional channels of sensor data. A force sensor that detects force of the wrist against the device can provide a first additional channel of sensor data. An accelerometer that senses acceleration in X, Y, and Z directions can provide second, third, and fourth additional channels of sensor data, respectively. In some examples, additional channels of sensor data can include data from a barometer, a magnetometer, a Global Positioning System (GPS) receiver, and/or numerous other possibilities. In some examples, other light sensors are used in place of or in addition to photodiodes. In some examples, a force sensor can be spatially discretized, sensing force independently at multiple positions of the surface of the device that contacts the wrist, in which case the force sensor can provide multiple (e.g., 4) channels of pressure information.

Figure 2A:
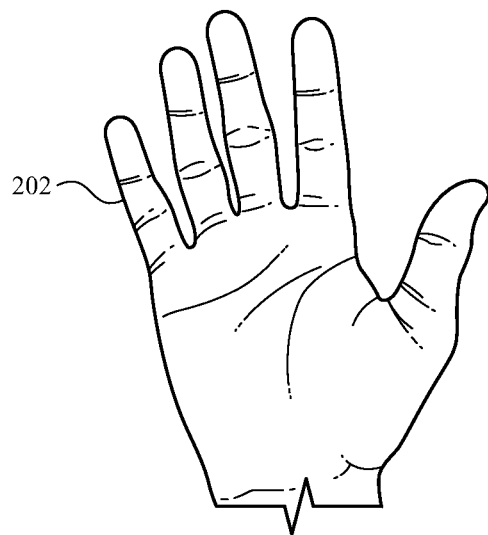
FIGS. 2A-2D illustrate exemplary hand gestures in accordance with examples of the disclosure.
Figure 2B:
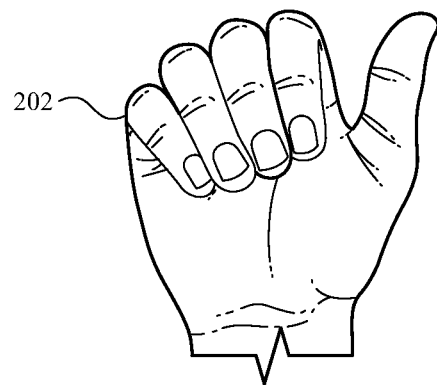
Figure 2C:
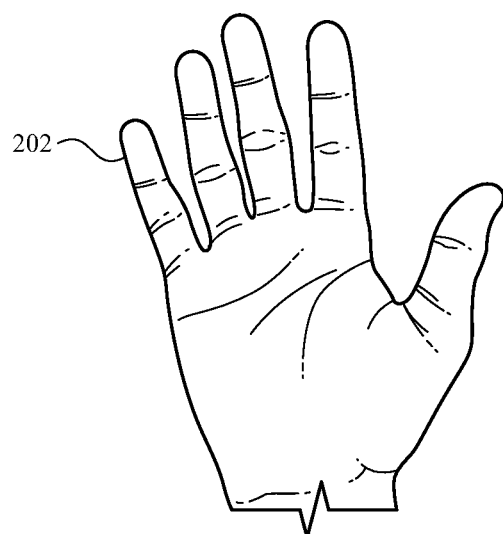

FIGS. 2A-2D illustrate exemplary hand gestures in accordance with examples of the disclosure. In some examples, a hand 202 can perform a hand flap gesture, as illustrated in FIGS. 2A-2C. In FIG. 2A, the fingers of the hand 202 are fully extended. In FIG. 2B, the fingers come down toward the palm of the hand 202. In FIG. 2C, the fingers return to a fully extended position.

Figure 2D:
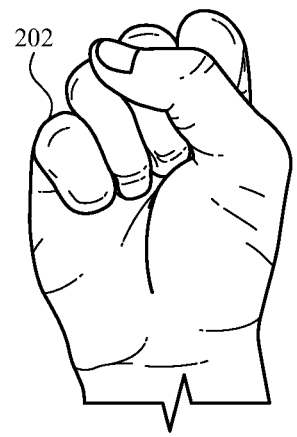

In some examples, a hand 202 can perform a hand clench gesture, as illustrated in FIG. 2D. FIG. 2D illustrates the hand 202 in a fist formation. The hand clench gesture can be performed by clenching the hand 202 when in the fist formation.

The FIGS. 2A-2D are examples of hand clench and hand flap gestures. Variations of these gestures and other gestures entirely may be trained on and detected in accordance with examples of the disclosure.

Figure 3:
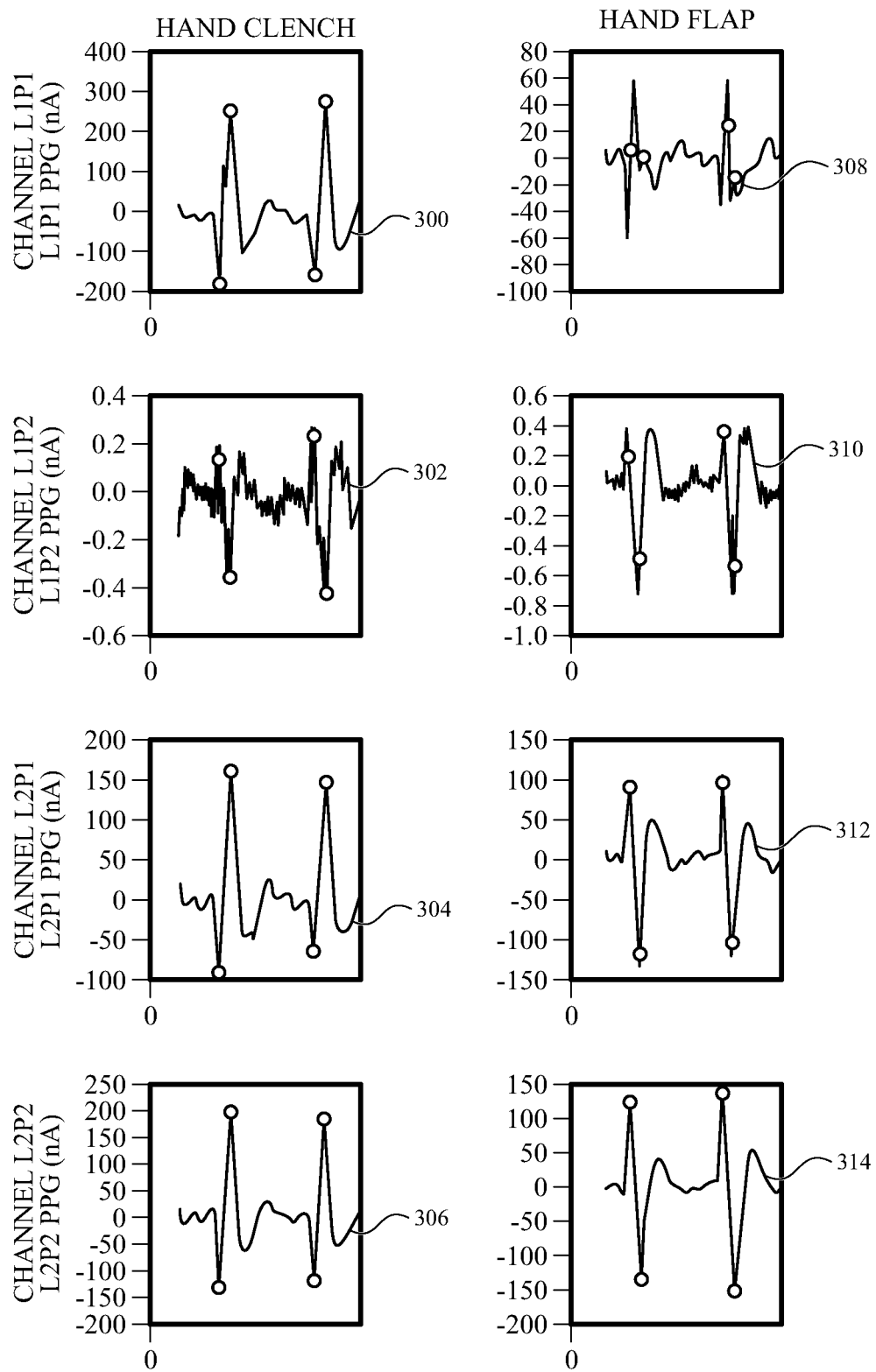
FIG. 3 illustrates exemplary charts of sensor data in accordance with examples of the disclosure.

FIG. 3 illustrates exemplary charts of sensor data in accordance with examples of the disclosure. For example, the sensor data 300, 302, 304, and 306 can represent different channels of sensor data during a hand clench gesture, and the sensor data 308, 310, 312, and 314 can represent different channels of sensor data during a hand flap gesture. In one example, 300 and 308 can represent sensor data from the first light emitter/first photodiode pair (channel L1P1), 302 and 310 can represent sensor data from the first light emitter/second photodiode pair (channel L1P2), 304 and 312 can represent sensor data from the second light emitter/first photodiode pair (channel L2P1), and 306 and 314 can represent sensor data from the second light emitter/second photodiode pair (channel L2P2).

As can be observed in FIG. 3, during the clench gesture, channels L1P1, L2P1, and L2P2 each exhibit a signal characteristic wherein the trough occurs just before the peak of the signal. In contrast, during the flap gesture, channels L1P2, L2P1, and L2P2 each exhibit a signal characteristic wherein the peak occurs just before the trough of the signal. Accordingly, the two gestures can be distinguished based on signal characteristics of the L2P1 and L2P2 channels.

Whereas the visual signal characteristics can be easily observed in the exemplary sensor data of FIG. 3, a number of quantitative signal characteristics may be calculated based on the sensor data before clustering. For example, an amplitude difference can be calculated between a peak and a trough of the sensor data, with sign indicating whether the peak comes before the trough or vice versa, a time difference can be calculated between a peak and a trough of the sensor data, a maximum amplitude can be calculated, a period between peaks of the sensor data can be calculated, and/or a phase can be detected in the sensor data, among other possibilities. In some examples, signal characteristics can be observed in a frequency domain. For example, one or more frames of sensor data may be analyzed (e.g., by a Fourier transform) to extract frequency information as additional signal characteristics. These and other signal characteristics can be extracted from any or all of the channels of sensor data, including light sensors, force sensors, an accelerometer, and/or other sensors.

FIGS. 4A-4D illustrate two-dimensional clustering examples in accordance with examples of the disclosure. In some examples, each frame in sensor data collection can be considered a point in multi-dimensional space, with each calculated signal characteristic for that frame being a coordinate in the multi-dimensional space. For example, sensor data can be collected during a first period in which a first gesture is performed by the user. The sensor data can be divided into a plurality of frames, and each frame can correspond to a set of coordinates defined by the signal characteristics calculated for that time frame. The data illustrated in FIGS. 4A-4D represent data collected with two signal characteristics: amplitude difference between peak and trough for the L2P1 and L2P2 channels, as discussed above with respect to FIG. 3. Although these figures only show two signal characteristics, examples of the disclosure are not so limited and contemplate using multiple kinds of signal characteristics from multiple channels, including light sensor data, force sensor data, and/or accelerometer data, among other possibilities.

Figure 4A:
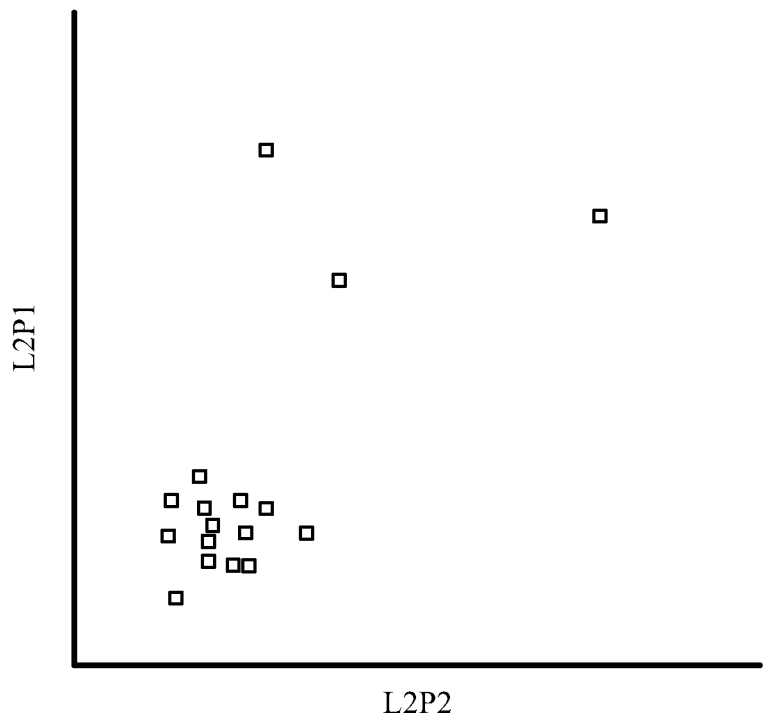
FIGS. 4A-4D illustrate two-dimensional clustering examples in accordance with examples of the disclosure.
Figure 4B:
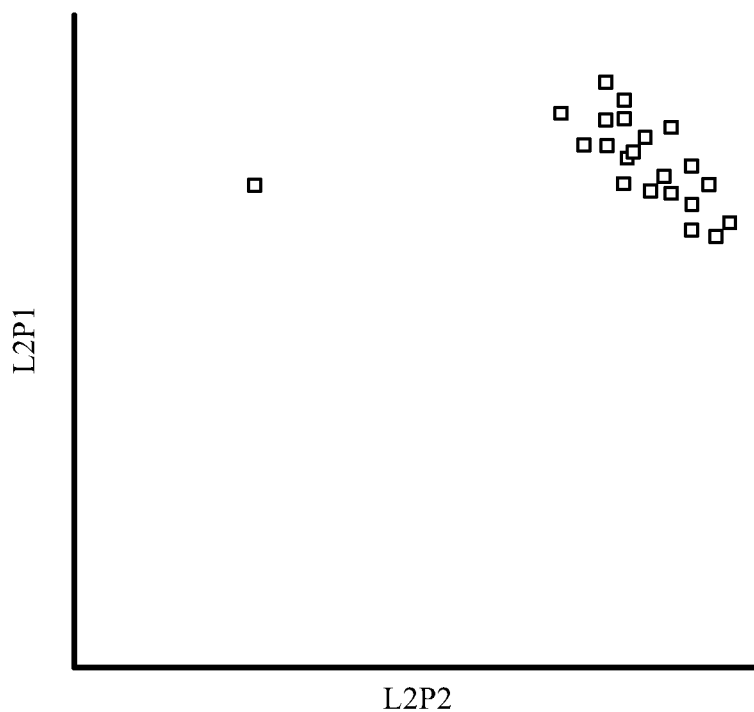
Figure 4C:
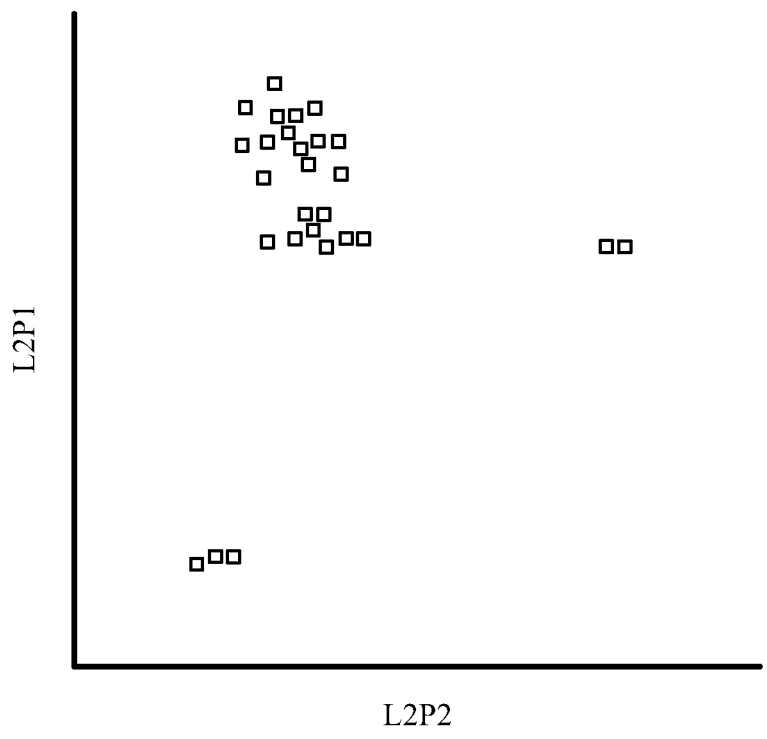
Figure 4D:
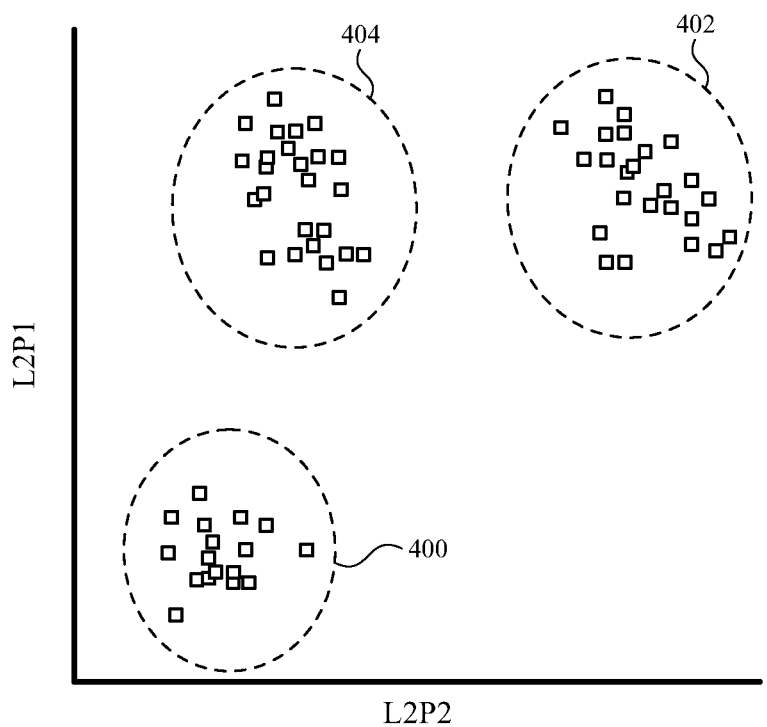

FIG. 4A illustrates sensor data collected during a first period in which a hand flap gesture is being performed as illustrated in FIGS. 2A-2C, possibly multiple times in succession. FIG. 4B illustrates sensor data collected during a second period in which a hand clench gesture is being performed as illustrated in FIG. 2D, possibly multiple times in succession. FIG. 4C illustrates sensor data collected during a third period in which no gesture is being performed. FIG. 4D illustrates the sensor data collected during all three periods, clustered into three clusters: first cluster 400, second cluster 402, and third cluster 404.

As shown in FIGS. 4A-4D together, most of the points corresponding to the first period belong to the first cluster, most of the points corresponding to the second period belong to the second cluster, and most of the points corresponding to the third period belong to the third cluster. Accordingly, it may be inferred that any point that belongs to the first cluster 400 was collected during performance of a hand flap gesture, and any point that belongs to the second cluster 402 was collected during performance of a hand clench gesture. Further, it may be inferred that any point that does not belong to the first cluster 400 or the second cluster 402 was not collected during performance of a hand clench or hand flap gesture.

Figure 5A:
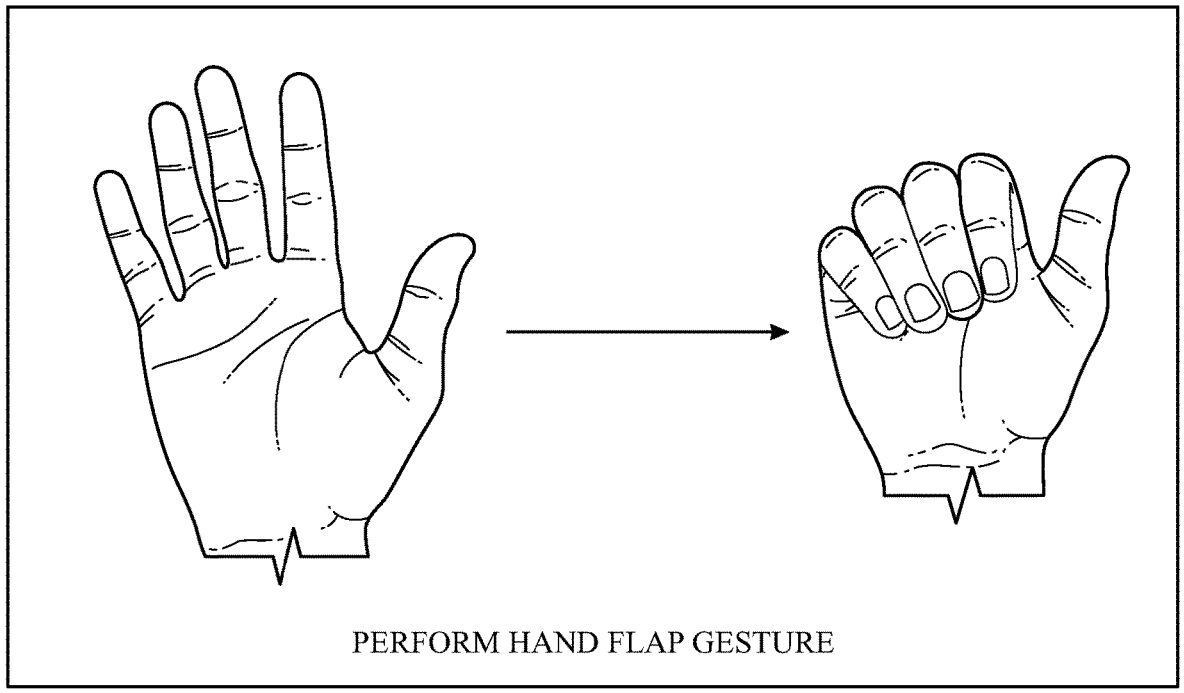
FIGS. 5A-5B illustrate training user interfaces in accordance with examples of the disclosure.
Figure 5B:
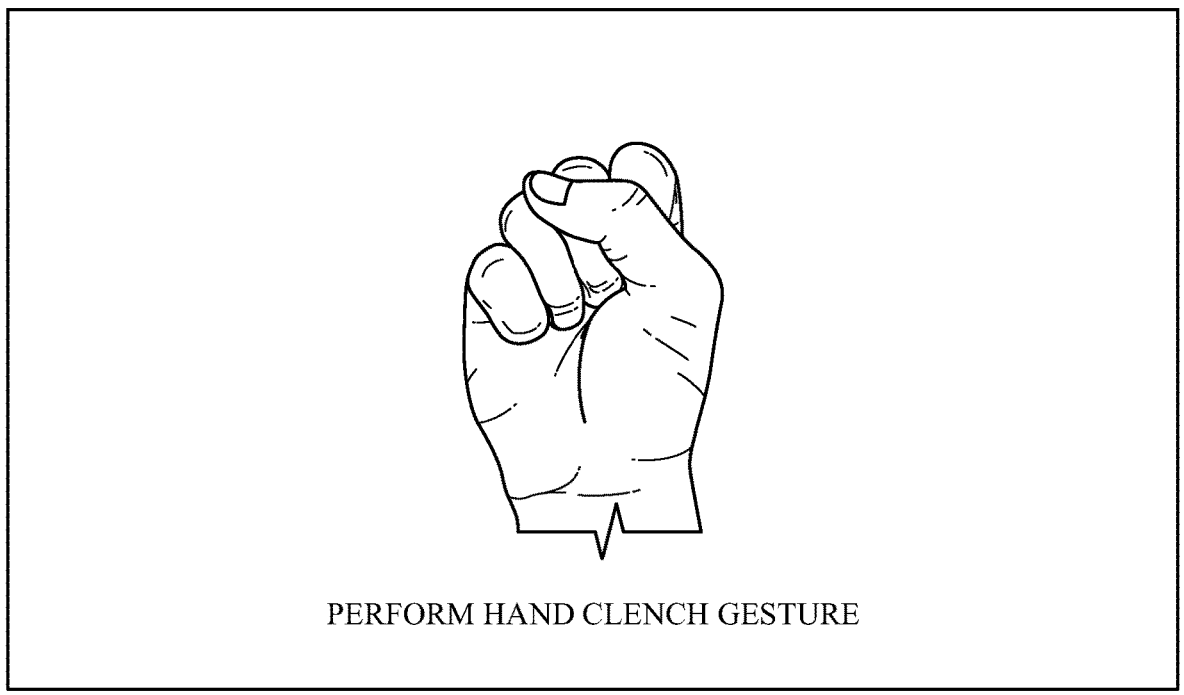

FIGS. 5A-5B illustrate training user interfaces in accordance with examples of the disclosure. FIG. 5A illustrates a user interface prompting a user to perform a hand flap gesture. Such a user interface may be displayed during a first period and sensor data may be collected during the first period while the user interface is displayed. FIG. 5B illustrates a user interface prompting a user to perform a hand clench gesture. Such a user interface may be displayed during a second period and sensor data may be collected during the second period while the user interface is displayed. Additional user interfaces may be displayed prompting a user to perform additional gestures to train for detection of the additional gestures.

Figure 6:
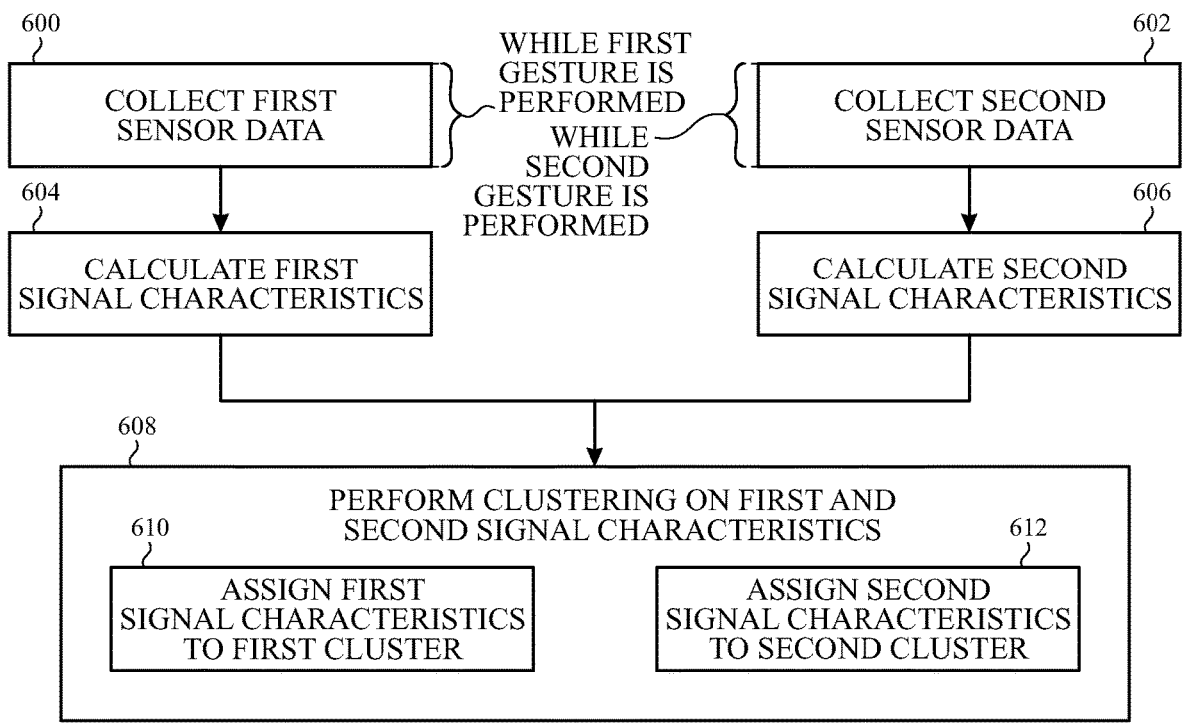
FIG. 6 illustrates an exemplary method of training for gesture detection in accordance with examples of the disclosure.

FIG. 6 illustrates an exemplary method of training for gesture detection in accordance with examples of the disclosure. In some examples, sensor data can be collected while the user performs various hand gestures to train the detection algorithm. During a first period in which the user performs a first hand gesture (e.g., when prompted by a user interface as illustrated in FIG. 5A), the electronic device can collect (600) first sensor data from the plurality of photodiodes. During a second period in which the user performs a second hand gesture (e.g., when prompted by a user interface as illustrated in FIG. 5B), the electronic device can collect (602) second sensor data from the plurality of photodiodes. In some examples, sensor data is further collected from other sensors, such as a force sensor and/or an accelerometer, among other possibilities.

After sensor data collection, signal characteristics can be extracted from the sensor data, as discussed above with respect to FIG. 3. The electronic device can calculate first signal characteristics (604) based on the first sensor data and calculate second signal characteristics (606) based on the second sensor data.

After calculating the signal characteristics, the electronic device can perform (608) clustering (e.g., a k-means clustering algorithm or other clustering algorithm) on the first and second signal characteristics. The clustering algorithm may assign (610) some or all of the first signal characteristics to a first cluster of signal characteristics, and assign (612) some or all of the second signal characteristics to a second cluster of signal characteristics.

In some examples, the electronic device can assign each cluster to one of the hand gestures as part of the training process. For example, the electronic device can compare the first cluster to the second cluster. Then, based on comparing the first cluster to the second cluster, the electronic device can determine there are more of the first signal characteristics assigned to the first cluster than to the second cluster. In accordance with the determination that there are more of the first signal characteristics assigned to the first cluster than to the second cluster, the electronic device can assign the first cluster to the first hand gesture. Similarly, based on comparing the first cluster to the second cluster, the electronic device can determine there are more of the second signal characteristics assigned to the second cluster than to the first cluster. In accordance with the determination that there are more of the second signal characteristics assigned to the second cluster than to the first cluster, the electronic device can assign the second cluster to the second hand gesture.

In some examples, the clustering process can be seeded by initially clustering the signal characteristics based on the time period in which the data was collected. For example, the first cluster can be initially assigned all the signal characteristics corresponding to the first period during which the first hand gesture was performed, and the second cluster can be initially assigned all the signal characteristics corresponding to the second period during which the second hand gesture was performed. Following this initial assignment, a clustering algorithm (e.g., k-means clustering) can be performed to optimize the clusters, potentially moving some points from the first cluster to the second cluster, moving some points from the second cluster to the first cluster, and/or moving some points from the first and second clusters to other clusters.

In some examples, the electronic device can generate a template for each of the first and second hand gestures to aid in the gesture detection process. For example, the electronic device can calculate first mean signal characteristics for the first cluster (e.g., as part of the k-means clustering process), and the first mean signal characteristics may be used as a template for the first cluster. Similarly, the first electronic device can calculate second mean signal characteristics for the second cluster (e.g., as part of the k-means clustering process), and the second mean signal characteristics may be used as a template for the second cluster. In another example, some or all of the first sensor data may be stored as the first template for the first cluster, and some or all of the second sensor data may be stored as the second template for the second cluster. In some examples, a generic template for each gesture may be stored and used as a starting point for the training process before any user-specific data has been collected. Then, each template can be adjusted based on user-specific data collected during training. Detection using templates is discussed further below.

In some examples, additional training can be conducted to train the device to detect when the user is not performing either the first or second gesture. The electronic device can collect additional sensor data during a period in which the user does not perform the first or second hand gesture. Signal characteristics can be calculated based on the additional sensor data, and these signal characteristics can be assigned to a third cluster. The third cluster can be a cluster that is associated with some third gesture (e.g., if the user performed a third gesture during the training period) or it can be a cluster that is not associated with any gesture.

Figure 7:
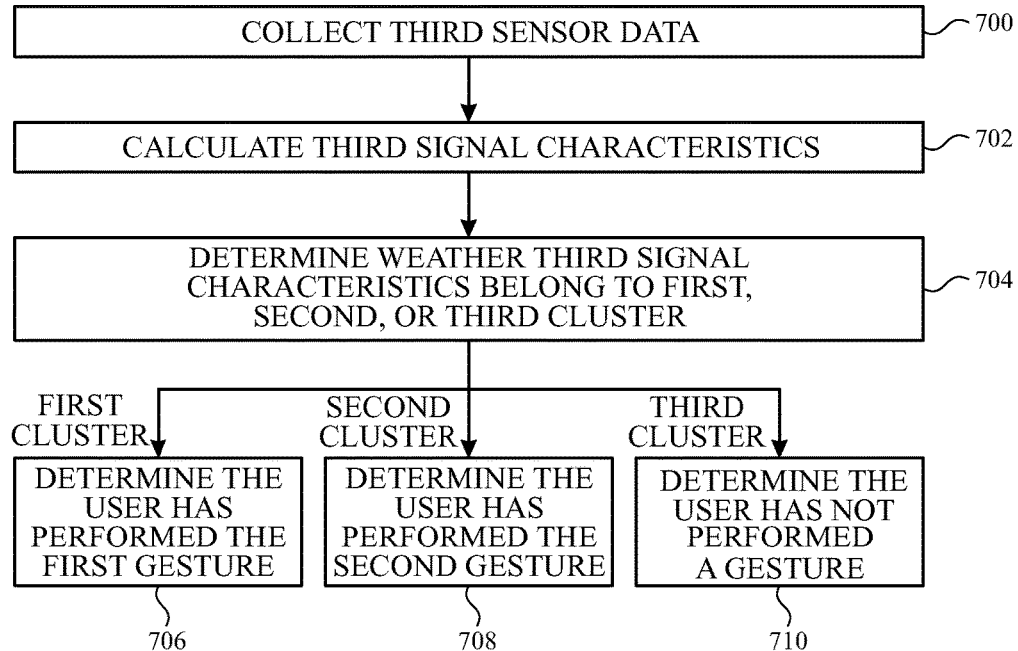
FIG. 7 illustrates an exemplary method of gesture detection in accordance with examples of the disclosure.

FIG. 7 illustrates an exemplary method of gesture detection in accordance with examples of the disclosure. After training, gestures can be detected by collecting new sensor data and then using the clusters associated with each gesture to determine if one of the gestures has been performed. During a third period (e.g., during use of the device after training has concluded), the electronic device can collect (700) third sensor data from the plurality of sensors. In some examples, sensor data is further collected from sensors other than photodiodes, such as a force sensor and/or an accelerometer, among other possibilities.

Signal characteristics can be again extracted from the sensor data, as described above with respect to FIG. 3. The electronic device can calculate (702) the third signal characteristics based on the third sensor data.

To perform gesture detection, the electronic device can determine (704) whether the third signal characteristics belong to the first cluster, the second cluster, or a third cluster. The third cluster can be a cluster that is associated with some third gesture, different from the first or second, or it can be a cluster that is not associated with any gesture.

In some examples, determining whether the third signal characteristics belong to the first cluster, the second cluster, or the third cluster includes performing clustering (e.g., a k-means clustering algorithm, or other clustering algorithm) on the third signal characteristics with respect to the first, second, and third clusters. The cluster membership of the third signal characteristics may be determined by the results of the clustering.

In some examples, determining whether the third signal characteristics belong to the first cluster, the second cluster, or the third cluster includes comparing the third signal characteristics to first, second, and/or third templates corresponding to the first, second, and third clusters, respectively. The electronic device can thereby determine whether the third signal characteristics are closer to the first cluster or the second cluster based on the templates. For example, if each template includes mean signal characteristics, then the electronic device can calculate a first distance from the third signal characteristics to the first template (e.g., the first mean signal characteristics of the first cluster) and calculate a second distance from the third signal characteristics to the second template (e.g., the second mean signal characteristics of the second cluster). The distance calculation can be a Euclidean distance calculation between two points in multi-dimensional space.

In accordance with a determination that the first distance is shorter than the second distance, the electronic device can determine that the third signal characteristics belong to the first cluster. In accordance with a determination that the second distance is shorter than the first distance, the electronic device can determine that the third signal characteristics belong to the second cluster. In some examples, the electronic device can also compare the third signal characteristics to a third template in the same manner, or, if both the first and second distances are longer than a predetermined threshold distance, the electronic device can determine that the third signal characteristics belong to a third cluster by default.

Based on determining which cluster the third signal characteristics belong to, the electronic device can detect the first gesture, the second gesture, or no gesture. In accordance with a determination that the third signal characteristics belong to the first cluster (e.g., the cluster associated with the first hand gesture), the electronic device can determine (706) that the user has performed the first hand gesture. In accordance with a determination that the third signal characteristics belong to the second cluster (e.g., the cluster associated with the second hand gesture), the electronic device can determine (708) that the user has performed the second hand gesture. In accordance with a determination that the third signal characteristics belong to the third cluster (e.g., a cluster associated with some third gesture, or no gesture whatsoever), the electronic device can determine (710) that the user has not performed the first hand gesture or the second hand gesture.

After detecting the first gesture or the second gesture, the electronic device can perform an operation associated with the detected gesture. For example, if the electronic device detects the first gesture, the electronic device can perform an operation in response, such as opening an application, closing an application, returning to a home screen, messaging a contact, etc.

In some examples, sensor data (e.g., the first, second, or third sensor data described above) can be further processed before extracting signal characteristics (e.g., the first, second, or third signal characteristics described above). For example, a band pass filter may be applied to sensor data to filter out heart rate frequencies from the sensor data. As light sensor data may vary according to the periodic motion of blood through human tissue, it may be beneficial to filter out these frequencies to better isolate the contribution of hand gesture motion to the signal characteristics.

Figure 8:
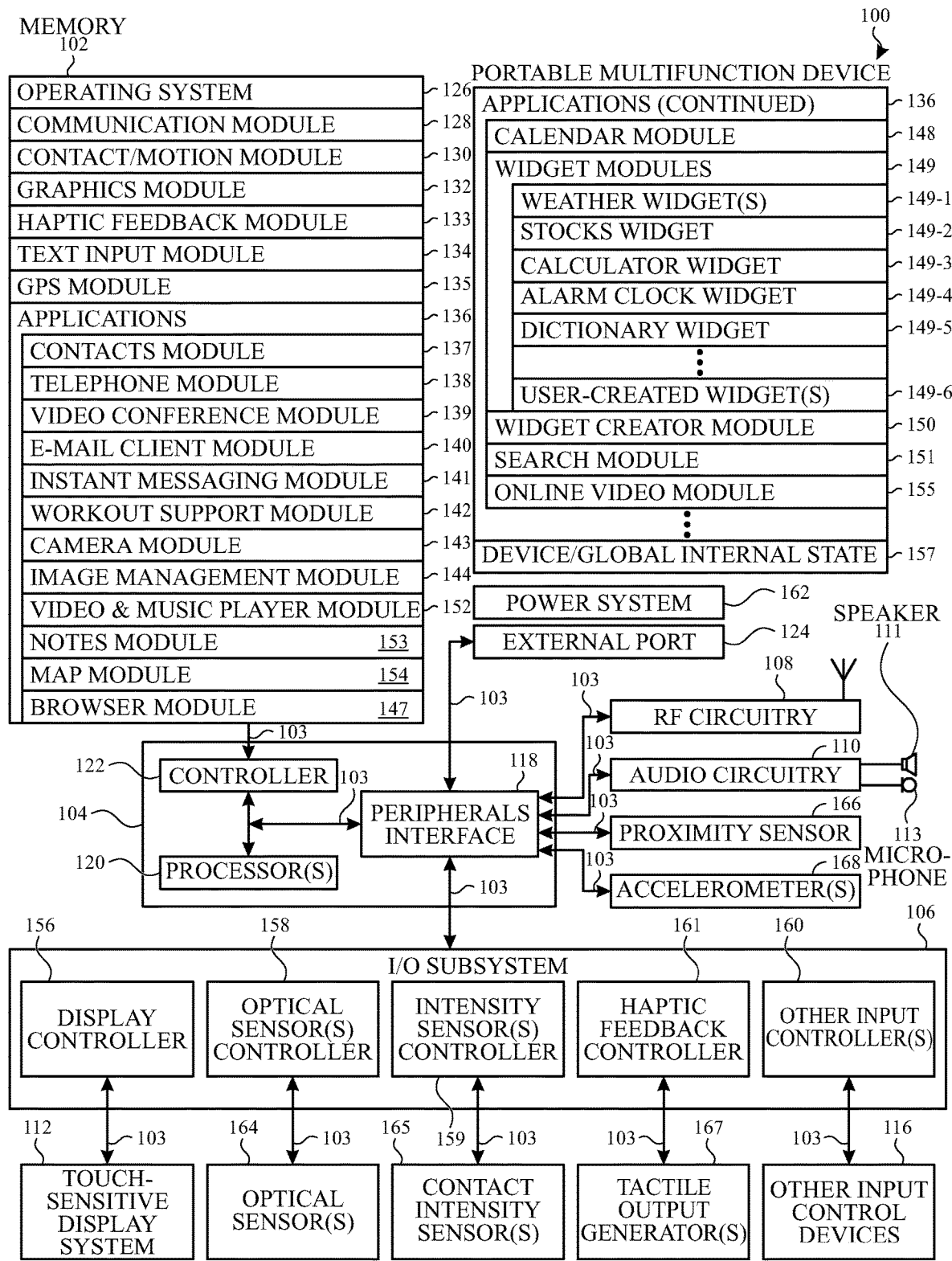
FIG. 8 is a block diagram illustrating a portable multifunction device with a touch-sensitive display in accordance with some examples.

Attention is now directed toward examples of portable devices with touch-sensitive displays. FIG. 8 is a block diagram illustrating portable multifunction device 100 with touch-sensitive display system 112 in accordance with some examples. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 8 are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some examples, peripherals interface 118, CPU 120, and memory controller 122 may be implemented on a single chip, such as chip 104. In some other examples, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some examples, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate examples, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. Patent Application Pub. No. 2007/0150842, "Unlocking a Device by Performing Gestures on an Unlock Image," published Jun. 28, 2007, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some examples, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In one example, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other examples. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In one example, projected mutual capacitance sensing technology is used, such as that found in the iPhone® and iPod Touch® from Apple Inc. of Cupertino, Calif.

A touch-sensitive display in some examples of touch screen 112 may be analogous to the multi-touch sensitive touchpads described in the following U.S. Pat. No. 6,323, 846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some examples of touch screen 112 may be as described in the following applications: (1) U.S. Patent Application Pub. No. 2007/0257890, "Multipoint Touch Surface Controller," published Nov. 8, 2007; (2) U.S. Patent Application Pub. No. 2006/0097991, "Multipoint Touchscreen," published May 11, 2006; (3) U.S. Patent Application Pub. No. 2006/0026521, "Gestures For Touch Sensitive Input Devices," published Feb. 2, 2006; (4) U.S. Patent Application Pub. No. 2006/0026536, "Gestures For Touch Sensitive Input Devices," published Feb. 2, 2006; (5) U.S. Patent Application Pub. No. 2006/0026535, "Mode-Based Graphical User Interfaces For Touch Sensitive Input Devices," published Feb. 2, 2006; (6) U.S. Patent Application Pub. No. 2006/0033724, "Virtual Input Device Placement On A Touch Screen User Interface," published Feb. 16, 2006; (7) U.S. Patent Application Pub. No. 2006/0053387, "Operation Of A Computer With A Touch Screen Interface," published Mar. 9, 2006; (8) U.S. Patent Application Pub. No. 2006/0085757, "Activating Virtual Keys Of A Touch-Screen Virtual Keyboard," published Apr. 20, 2006; and (9) U.S. Patent Application Pub. No. 2006/0197753, "Multi-Functional Hand-Held Device," published Sep. 7, 2006. All of these applications are incorporated by reference herein in their entirety.

Touch screen 112 may have a video resolution in excess of 100 dpi. In some examples, the touch screen has a video resolution of 160 dpi. The user may make contact with touch screen 112 using any suitable object or appendage, such as a stylus, a finger, and so forth. In some examples, the user interface is designed to work primarily with finger-based contacts and gestures, which can be less precise than stylus-based input due to the larger area of contact of a finger on the touch screen. In some examples, the device translates the rough finger-based input into a precise pointer/cursor position or command for performing the actions desired by the user.

In some examples, in addition to the touch screen, device 100 may include a touchpad (not shown) for activating or deactivating particular functions. In some examples, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 8 shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some examples, an optical sensor is located on the back of device 100, opposite touch screen display 112 on the front of the device so that the touch screen display may be used as a viewfinder for still and/or video image acquisition. In some examples, an optical sensor is located on the front of the device so that the user's image may be obtained for video conferencing while the user views the other video conference participants on the touch screen display. In some examples, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 8 shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some examples, at least one contact intensity sensor is collocated with, or proximate to, a touch-sensitive surface (e.g., touch-sensitive display system 112). In some examples, at least one contact intensity sensor is located on the back of device 100, opposite touch screen display 112, which is located on the front of device 100.

Device 100 may also include one or more proximity sensors 166. FIG. 6 shows proximity sensor 166 coupled to peripherals interface 118. Alternately, proximity sensor 166 may be coupled to input controller 160 in I/O subsystem 106. Proximity sensor 166 may perform as described in U.S. Patent Application Pub. Nos. 2006/0161871, "Proximity Detector In Handheld Device"; 2006/0161870, "Proximity Detector In Handheld Device"; 2008/0167834, "Using Ambient Light Sensor To Augment Proximity Sensor Output"; 2007/0075965, "Automated Response To And Sensing Of User Activity In Portable Devices"; and 2008/0140868, "Methods And Systems For Automatic Configuration Of Peripherals," which are hereby incorporated by reference in their entirety. In some examples, the proximity sensor turns off and disables touch screen 112 when the multifunction device is placed near the user's ear (e.g., when the user is making a phone call).

Device 100 optionally also includes one or more tactile output generators 167. FIG. 8 shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some examples, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some examples, at least one tactile output generator sensor is located on the back of device 100, opposite touch screen display 112, which is located on the front of device 100.

Device 100 may also include one or more accelerometers 168. FIG. 8 shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some examples, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some examples, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some examples, memory 102 (FIG. 8) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some examples, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some examples, contact/motion module 130 and display controller 156 detect contact on a touchpad.

In some examples, contact/motion module 130 uses a set of one or more intensity thresholds to determine whether an operation has been performed by a user (e.g., to determine whether a user has "clicked" on an icon). In some examples, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some examples, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some examples, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some examples, a widget includes an HTML (Hypertext Markup Language) file, a CSS (Cascading Style Sheets) file, and a JavaScript file. In some examples, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some examples, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some examples, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. Patent Application Pub. No. 2008/0320391, "Portable Multifunction Device, Method, and Graphical User Interface for Playing Online Videos," published Dec. 25, 2008, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various examples. For example, video player module may be combined with music player module into a single module (e.g., video and music player module 152, FIG. 8). In some examples, memory 102 may store a subset of the modules and data structures identified above. Furthermore, memory 102 may store additional modules and data structures not described above.

In some examples, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some examples, the touchpad, when touched by the user, navigates device 100 to a main, home, or root menu from any user interface that is displayed on device 100. In such examples, a "menu button" is implemented using a touchpad. In some other examples, the menu button is a physical push button or other physical input control device instead of a touchpad.

In some examples, a method of detecting hand gestures performed by a user of an electronic device including a plurality of photodiodes is disclosed. The method may include: during a first period in which the user performs a first hand gesture, collecting first sensor data from the plurality of photodiodes; during a second period in which the user performs a second hand gesture, collecting second sensor data from the plurality of photodiodes; calculating first signal characteristics based on the first sensor data and second signal characteristics based on the second sensor data; assigning some or all of the first signal characteristics to a first cluster of signal characteristics; assigning some or all of the second signal characteristics to a second cluster of signal characteristics; during a third period, collecting third sensor data from the plurality of photodiodes; calculating third signal characteristics based on the third sensor data; determining whether the third signal characteristics belong to the first cluster, the second cluster, or a third cluster; in accordance with a determination that the third signal characteristics belong to the first cluster, determining that the user has performed the first hand gesture; in accordance with a determination that the third signal characteristics belong to the second cluster, determining that the user has performed the second hand gesture; and in accordance with a determination that the third signal characteristics belong to the third cluster, determining that the user has not performed the first hand gesture or the second hand gesture.

Additionally or alternatively to the other disclosed examples, the method may further include: comparing the first cluster to the second cluster; based on comparing the first cluster to the second cluster, determining there are more of the first signal characteristics assigned to the first cluster than to the second cluster; and in accordance with the determination that there are more of the first signal characteristics assigned to the first cluster than to the second cluster, assigning the first cluster to the first hand gesture. Additionally or alternatively to the other disclosed examples, the method may further include: based on comparing the first cluster to the second cluster, determining there are more of the second signal characteristics assigned to the second cluster than to the first cluster; and in accordance with the determination that there are more of the second signal characteristics assigned to the second cluster than to the first cluster, assigning the second cluster to the second hand gesture. Additionally or alternatively to the other disclosed examples, the method may further include: generating a first template for the first hand gesture and a second template for the second hand gesture; and comparing the third signal characteristics to the first and second templates. Additionally or alternatively to the other disclosed examples, the method may further include: calculating first mean signal characteristics for the first cluster, wherein the first template is generated based on the first mean signal characteristics for the first cluster; and calculating second mean signal characteristics for the second cluster, wherein the second template is generated based on the second mean signal characteristics for the second cluster. Additionally or alternatively to the other disclosed examples, comparing the third signal characteristics to the first and second templates may include: calculating a first distance from the third signal characteristics to the first template and calculating a second distance from the third signal characteristics to the second template; in accordance with a determination that the first distance is shorter than the second distance, determining that the third signal characteristics belong to the first cluster; and in accordance with a determination that the second distance is shorter than the first distance, determining that the third signal characteristics belong to the second cluster. Additionally or alternatively to the other disclosed examples, generating the first template for the first hand gesture may include storing some or all of the first sensor data as the first template, and generating the second template for the second hand gesture may include storing some or all of the second sensor data as the second template. Additionally or alternatively to the other disclosed examples, calculating the first signal characteristics may include calculating at least one of: an amplitude difference between a peak and a trough of the first sensor data, a time difference between a peak and a trough of the first sensor data, a maximum amplitude of the first sensor data, a period between peaks of the first sensor data, and a phase of the first sensor data. Additionally or alternatively to the other disclosed examples, the method may further include: filtering heart rate frequencies from the first sensor data before calculating the first signal characteristics based on the first sensor data. Additionally or alternatively to the other disclosed examples, the method may further include: during the first period in which the user performs the first hand gesture, further collecting the first sensor data from at least one of a force sensor and an accelerometer. Additionally or alternatively to the other disclosed examples, collecting the first sensor data from the plurality of photodiodes may include collecting a first channel of infrared light and collecting a second channel of green light. Additionally or alternatively to the other disclosed examples, the method may further include: during a fourth period in which the user does not perform the first or second hand gesture, collecting fourth sensor data from the plurality of photodiodes; calculating fourth signal characteristics based on the fourth sensor data; and assigning some or all of the fourth signal characteristics to the third cluster of signal characteristics. Additionally or alternatively to the other disclosed examples, assigning the first and second signal characteristics to the first and second clusters may be performed using a k-means clustering algorithm. Additionally or alternatively to the other disclosed examples, the k-means clustering algorithm may also be applied to the third signal characteristics and determining whether the third signal characteristics belong to the first cluster, the second cluster, or the third cluster may be based on the k-means clustering algorithm.

In some examples, a non-transitory computer readable medium is disclosed, the computer readable medium containing instructions, that, when executed, perform a method. The method may include: The method may include: during a first period in which the user performs a first hand gesture, collecting first sensor data from the plurality of photodiodes; during a second period in which the user performs a second hand gesture, collecting second sensor data from the plurality of photodiodes; calculating first signal characteristics based on the first sensor data and second signal characteristics based on the second sensor data; assigning some or all of the first signal characteristics to a first cluster of signal characteristics; assigning some or all of the second signal characteristics to a second cluster of signal characteristics; during a third period, collecting third sensor data from the plurality of photodiodes; calculating third signal characteristics based on the third sensor data; determining whether the third signal characteristics belong to the first cluster, the second cluster, or a third cluster; in accordance with a determination that the third signal characteristics belong to the first cluster, determining that the user has performed the first hand gesture; in accordance with a determination that the third signal characteristics belong to the second cluster, determining that the user has performed the second hand gesture; and in accordance with a determination that the third signal characteristics belong to the third cluster, determining that the user has not performed the first hand gesture or the second hand gesture.

In some examples, an electronic device is disclosed. The electronic device may include: one or more processors; memory; a plurality of photodiodes; and one or more programs, wherein the one or more programs are stored in the memory and are configured to be executed by the one or more processors, which when executed by the one or more processors, cause the electronic device to perform a method. The method may include: during a first period in which the user performs a first hand gesture, collecting first sensor data from the plurality of photodiodes; during a second period in which the user performs a second hand gesture, collecting second sensor data from the plurality of photodiodes; calculating first signal characteristics based on the first sensor data and second signal characteristics based on the second sensor data; assigning some or all of the first signal characteristics to a first cluster of signal characteristics; assigning some or all of the second signal characteristics to a second cluster of signal characteristics; during a third period, collecting third sensor data from the plurality of photodiodes; calculating third signal characteristics based on the third sensor data; determining whether the third signal characteristics belong to the first cluster, the second cluster, or a third cluster; in accordance with a determination that the third signal characteristics belong to the first cluster, determining that the user has performed the first hand gesture; in accordance with a determination that the third signal characteristics belong to the second cluster, determining that the user has performed the second hand gesture; and in accordance with a determination that the third signal characteristics belong to the third cluster, determining that the user has not performed the first hand gesture or the second hand gesture.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. A device comprising:
   a housing, configured to be strapped to a wrist of a user with a surface of the housing proximate to one side of the wrist;
   a plurality of light emitters disposed within the housing and configured to emit light through the surface toward a tissue of the user;
   a plurality of photodiodes disposed within the housing and configured to:
      receive at least a portion of a reflection of the emitted light through the surface; and
      generate sensor data indicative of movement of anatomic features in the tissue of the user;
   a plurality of channels, each channel associated with one of the plurality of light emitters and one of the plurality of photodiodes and further associated with a signal pattern including the sensor data from the respective photodiode; and
   logic disposed within the housing and configured to:
      receive the signal patterns of the plurality of channels,
      determine signal characteristics from the signal patterns,
      determine a difference in the signal characteristics of at least two of the plurality of channels, and
      determine a hand gesture from the determined difference in the signal characteristics.

2. The device of claim 1, wherein the signal patterns from at least some of the plurality of channels are associated with a hand clench of the user, and the signal patterns from others of the plurality of channels are associated with a hand flap of the user.

3. The device of claim 1, wherein the plurality of light emitters includes two light emitters, the plurality of photodiodes includes two photodiodes, and the plurality of channels includes eight channels.

4. The device of claim 1, wherein the determination of the signal characteristics of the signal patterns includes determining a relationship between a peak and a trough of at least one of the signal patterns.

5. The device of claim 4, wherein at least some of the signal characteristics include the trough occurring before the peak in the respective signal pattern, and the relationship is identified by a sign indicative of the trough occurring before the peak.

6. The device of claim 4, wherein at least some of the signal characteristics include the peak occurring before the trough in the respective signal pattern, and the relationship is identified by a sign indicative of the peak occurring before the trough.

7. The device of claim 1, wherein the determination of the signal characteristics of the signal patterns includes determining a time difference between a peak and a trough in a signal pattern.

8. The device of claim 1, wherein the determination of the signal characteristics of the signal patterns includes determining a period between peaks in a signal pattern.

9. The device of claim 1, wherein the determination of the signal characteristics of the signal patterns includes determining a phase between peaks in a signal pattern.

10. The device of claim 1, wherein the sensor data is divided into a plurality of frames and the logic is further configured to:
    analyze one or more of the plurality of frames and extract frequency information as additional signal characteristics used in the determination of the hand gesture.

11. The device of claim 1, further comprising:
    one or more of a force sensor and an accelerometer, wherein the force sensor is configured to measure a force and generate force sensor data, and the accelerometer is configured to measure an acceleration and generate accelerometer data,
    wherein the logic is further configured to:
    receive the force sensor data, the accelerometer data, or both, and
    further determine the signal characteristics from the received force sensor data, the received accelerometer data, or both.

12. A method of determining a hand gesture, the method comprising:
    emitting light from a plurality of light emitters disposed in a housing strapped to a wrist of a user, the housing having a surface proximate to one side of the wrist, and the light emitted through the surface toward a tissue of the user;
    receiving at least a portion of a reflection of the emitted light through the surface, the portion of the reflection being received using a plurality of photodiodes disposed within the housing;
    generating sensor data from the received light, the sensor data indicative of movement of anatomic features in the tissue of the user;

associating the plurality of light emitters and plurality of photodiodes with a plurality of channels;

associating signal patterns included in the sensor data to the plurality of channels;

determining signal characteristics from the signal patterns;

determining a difference in the signal characteristics of at least two of the plurality of channels; and determining the hand gesture from the determined difference in the signal characteristics.

13. The method of claim 12, wherein the association of the signal patterns to the plurality of channels includes:

associating the signal patterns from at least some of the plurality of channels with a hand clench of the user; and associating the signal patterns from others of the plurality of channels with a hand flap of the user.

14. The method of claim 12, wherein the determination of the signal characteristics of the signal patterns includes determining a relationship between a peak and a trough of a signal pattern.

15. The method of claim 14, wherein the relationship includes a sign indicative of a relative order of the peak and the trough in the signal pattern or a time difference between the peak and the trough in the signal pattern.

16. The method of claim 12, further comprising:

performing one or more of:

measuring a force using a force sensor and generating force sensor data indicative of the measured force, and measuring an acceleration using an accelerometer and generating accelerometer data indicative of the measured acceleration; and further determining the signal characteristics from the received force sensor data, the received accelerometer data, or both.

17. The method of claim 12, further comprising: filtering out information from the sensor data before the determination of the signal characteristics.

18. The method of claim 17, wherein the information includes heart rate frequencies.

* * * * *